US 010732951B2

(12) United States Patent
Jayanthi et al.

(10) Patent No.: US 10,732,951 B2
(45) Date of Patent: Aug. 4, 2020

(54) CONTAINER IMAGES

(71) Applicant: Hewlett Packard Enterprise Development LP, Houston, TX (US)

(72) Inventors: Swaroop Jayanthi, Hyderabad (IN); Sudheer Yetukuri, Hyderabad (IN); Brahmanand Vuppuluri, Bangalore (IN); Rajesh Teeparti, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 210 days.

(21) Appl. No.: 15/337,017

(22) Filed: Oct. 28, 2016

(65) Prior Publication Data

US 2018/0121485 A1    May 3, 2018

(51) Int. Cl.
*G06F 16/00* (2019.01)
*G06F 8/61* (2018.01)
*G06F 16/27* (2019.01)
*G06F 16/16* (2019.01)
*G06F 16/11* (2019.01)
*G06F 9/455* (2018.01)

(52) U.S. Cl.
CPC .............. *G06F 8/63* (2013.01); *G06F 16/128* (2019.01); *G06F 16/164* (2019.01); *G06F 16/27* (2019.01); *G06F 9/455* (2013.01)

(58) Field of Classification Search
CPC .......... G06F 8/63; G06F 9/455; G06F 16/128; G06F 16/164; G06F 16/27
See application file for complete search history.

(56) References Cited

U.S. PATENT DOCUMENTS

| | | | |
|---|---|---|---|
| 9,197,663 B1* | 11/2015 | Gilbert | G06F 3/04817 |
| 9,256,467 B1* | 2/2016 | Singh | G06F 9/5055 |
| 9,785,643 B1* | 10/2017 | Patil | G06F 3/0608 |
| 9,811,806 B1* | 11/2017 | Kuang | G06Q 10/10 |
| 10,154,065 B1* | 12/2018 | Buchler | H04L 63/20 |
| 2003/0221095 A1* | 11/2003 | Gaunt | G06F 11/1417 713/1 |
| 2006/0149714 A1* | 7/2006 | Fellenstein | G06F 8/63 |
| 2013/0198863 A1* | 8/2013 | Wallin | G06F 21/10 726/28 |
| 2017/0180346 A1* | 6/2017 | Suarez | G06F 9/45558 |

FOREIGN PATENT DOCUMENTS

WO    WO-2016099346    6/2016

* cited by examiner

*Primary Examiner* — Dinku W Gebresenbet
(74) *Attorney, Agent, or Firm* — Hewlett Packard Enterprise Patent Department

(57) ABSTRACT

Examples described relate to container images. An example method may include generating a mapping of respective unique identifiers of container images of a software container and respective metadata of the container images, validating the mapping against a rule to identify a unique identifier of a mapped container image that meets the rule, generating a target mapping that includes the unique identifier of the mapped container image that meets the rule and the action specified in the rule, and performing the action specified in the rule on the mapped container image corresponding to the unique identifier in the target mapping.

16 Claims, 4 Drawing Sheets

CONTAINER IMAGES

BACKGROUND

The Information technology (IT) infrastructure of organizations may vary in scale and scope based on latter's size and respective requirements. For example, the number of software applications deployed in an organization may vary from a few basic software applications (for example, email) to large and complex applications.

BRIEF DESCRIPTION OF THE DRAWINGS

For a better understanding of the solution, examples will now be described, purely by way of example, with reference to the accompanying drawings, in which.

DETAILED DESCRIPTION

Figure 1:
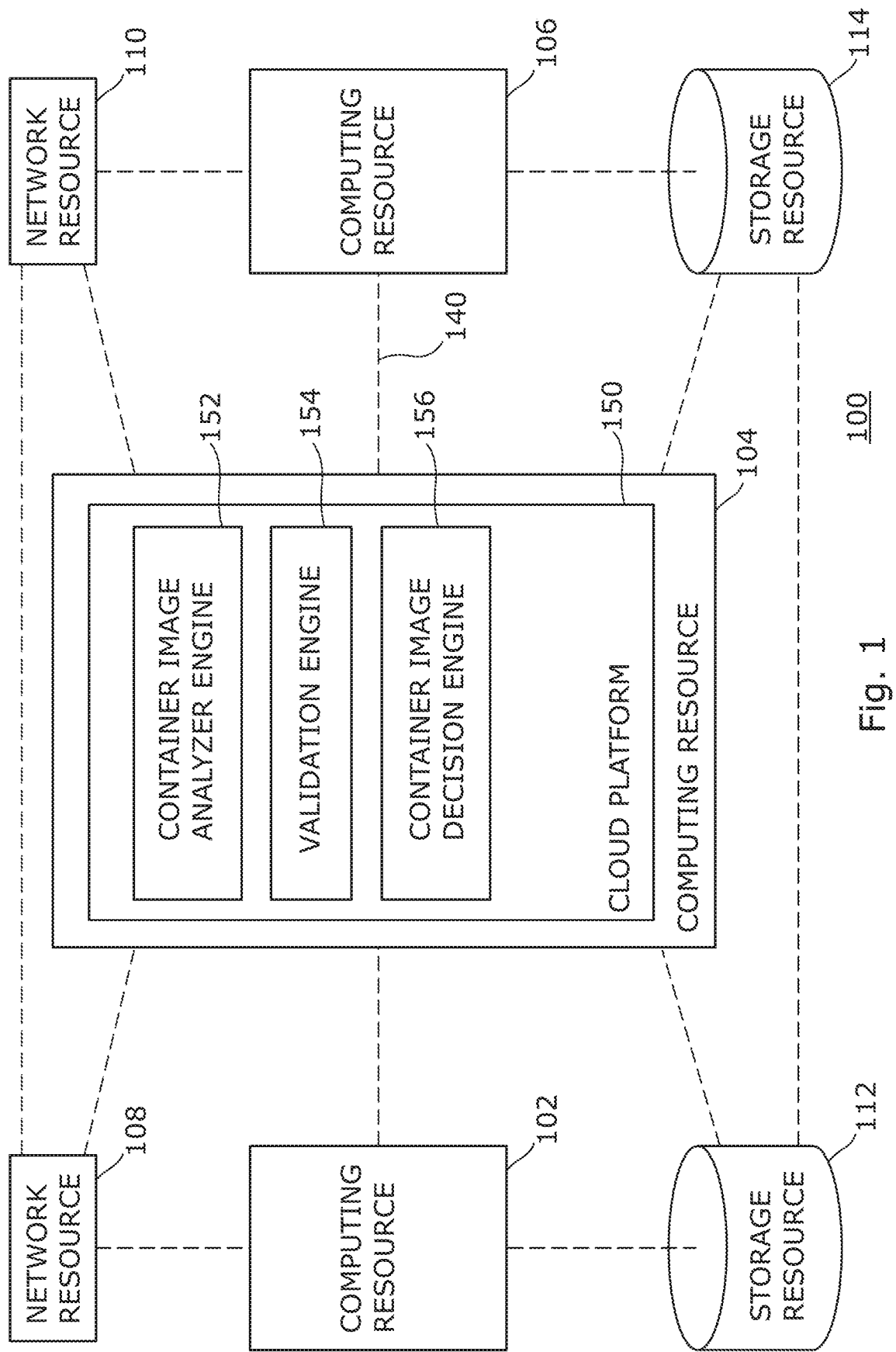
FIG. 1 is a block diagram of an example computing environment for managing container images.

The IT environment of an enterprise may comprise of a handful of software applications to hundreds of applications. Managing the entire software lifecycle of these applications may pose technical challenges. One of these challenges may relate to portability of a software application from one computing environment to another. In one example scenario, this may include porting an application from a staging environment to a production environment. In another example, an application may need to be ported from a physical machine environment to a virtual machine environment. Organizations are thus increasingly looking at simple portable solutions that could help them package, ship, and run their computer applications on a variety of computing platforms. Software containers may offer one such option.

Software containers may provide a mechanism to securely run an application in an isolated environment, which may be packed with all its dependencies and libraries. A software container thus may include an entire runtime environment: an application, its dependencies, libraries, and configuration files that may be bundled into one package. Since an application may be run in an environment that the application expects, software containers may simplify testing and deployment of an application.

In an example, an image (or "container image") may represent a build component of a software container. An image may include a series of layers, and a file system may be used to combine these layers into a single image. An image may thus include a filesystem and parameters to use at runtime. For example, an image may contain a Linux operating system with Apache and a web application. A running instance of an image may be referred to as software container.

Container images may be very large in size. Their size may increase further in case updates are made to any layer(s). Thus, they may end up consuming a large amount of disk space. This may not be a desirable scenario from an organization's perspective since they may have to incur cost for storing these images. Further, as the number of container images increase, it may become difficult to identify and manage, for example, outdated, unsecured, low-priority, and corrupted images. Additionally, it may also become difficult to identify relevant container images for backing to a storage device. Therefore, managing container images effectively may pose technical challenges.

To address these technical challenges, the present disclosure describes various examples for managing container images. In an example, a mapping of a respective unique identifier of container images of a software container and respective metadata of the container images may be generated. The mapping may be validated against a rule to identify a unique identifier of a mapped container image that meets the rule, wherein the rule may specify an action to be performed on the mapped container image in an event the mapped container image meets a condition defined in the rule for performing the action. A target mapping of the unique identifier of the mapped container image that meets the rule and the action specified in the rule may be generated. The action specified in the rule may be performed on the mapped container image corresponding to the unique identifier in the target mapping.

FIG. 1 is a block diagram of an example computing environment 100 for managing container images. In an example, computing environment 100 may include computing resources 102, 104, and 106, network resources 108 and 110, and storage resources 112 and 114. Although three computing resources, two network resources and two storage resources are shown in FIG. 1, other examples of this disclosure may include more or less than three computing resources, more or less than two network resources, and more or less than two storage resources.

Computing resources 102, 104, and 106 may each be a computing device (i.e. includes at least one processor). The computing device may represent any type of system capable of reading machine-executable instructions. Examples of the computing device may include a server, a desktop computer, a notebook computer, a tablet computer, a thin client, a mobile device, a personal digital assistant (PDA), and the like. In an example, computing resources 102, 104, and 106 may each represent software resources (machine-executable instructions). The software resources may include, for example, operating system software, firmware, and application software. Other examples of the software resources may include virtual machines, virtual servers, load balancers, firewalls, etc. In an example, computing resources 102, 104, and 106 may each be a combination of hardware and software resources.

Network resources 108 and 110 may each be a network device, a network software, or any combination thereof. Some non-limiting examples of the network device may include a hub, a network switch, a network router, a virtual switch, and a virtual router.

Storage resources 112 and 114 may each be a storage device, a storage software, or any combination thereof. The storage device may be an internal storage device, an external storage device, or a network attached storage device. Other examples of the storage device may include a hard disk drive, a storage disc (for example, a CD-ROM, a DVD, etc.), a storage tape, a solid state drive, a USB drive, a Serial Advanced Technology Attachment (SATA) disk drive, a Fibre Channel (FC) disk drive, a Serial Attached SCSI (SAS) disk drive, a magnetic tape drive, an optical jukebox, and the like. In other examples, the storage device may be a Direct Attached Storage (DAS) device, a Network Attached Storage (NAS) device, a Redundant Array of Inexpensive Disks (RAID), a data archival storage system, or a block-based device over a storage area network (SAN). In one example, the storage device may be a storage array, which may include one or more storage drives (for example, hard disk drives, solid state drives, etc.).

Computing resources 102, 104, and 106, network resources 108 and 110, and storage resources 112 and 114 may be communicatively coupled, for example, via a computer network 140. Computer network 140 may be a wireless or wired network. Computer network 140 may include, for example, a Local Area Network (LAN), a Wireless Local Area Network (WAN), a Metropolitan Area Network (MAN), a Storage Area Network (SAN), a Campus Area Network (CAN), or the like. Further, computer network 140 may be a public network (for example, the Internet) or a private network (for example, an intranet).

In an example, computing environment 100 may represent a cloud computing environment, and computing resources 102, 104, and 106, network resources 108 and 110, and storage resources 112 and 114 may be referred to as cloud resources. Cloud computing environment 100 may represent a public cloud, a private cloud, or a hybrid cloud. Cloud computing environment 100 may be used to provide or deploy various types of cloud services. These may include Infrastructure as a Service (IaaS), Platform as a Service (PaaS), Software as a Service (SaaS), and so forth. In another example, computing environment 100 may represent a data center.

In an example, cloud computing environment 100 may include a cloud platform 150. In an example, cloud platform 150 may be used to manage computing resources 102, 104, and 106, network resources 108 and 110, and storage resources 112 and 114. In an example, one or more of computing resources 102, 104, and 106, network resources 108 and 110, and storage resources 112 and 114 may be used by the cloud platform 150 to provide a cloud service (for example, IaaS) to a user. From a user's perspective, the cloud platform 150 may be used, for example, to request a new cloud service and manage an existing cloud service. Users may also use the cloud platform 150 to view a status of a pending cloud service request, pending approvals, and approved service subscriptions. A non-limiting example of the cloud platform may include OpenStack.

The cloud platform 150 may be hosted on one or more of computing resources 102, 104, and 106. For the sake of simplicity in illustration, FIG. 1 illustrates cloud platform 150 on computing resource 104, by way of an example. However, any of the other computing resources (for example, 102 and 106) may host cloud platform 150 as well. In an example, computing resource 104 may include a container image analyzer engine 152, a validation engine 154, and a container image decision engine 156. For the sake of simplicity in illustration, computing resource 104 is shown to include the container image analyzer engine 152, the validation engine 154, and the container image decision engine 156. However, any of the other computing resources may include these engines.

Engines 152, 154, and 156 may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of the computing resource 104. In some examples, the at least one machine-readable storage medium may store instructions that, when executed by the at least one processing resource, at least partially implement some or all engines of the computing device. In such examples, the computing resource 104 may include the at least one machine-readable storage medium storing the instructions and the at least one processing resource to execute the instructions.

In an example, engines 152, 154, and 156 may be a part of a Representational state transfer (RESTful) service or Application Programming Interface (API). In an example, the RESTful service may be referred to as Simple Container Service (SCS). In an example, the SCS service may be included as a plug-in to cloud platform 150.

In an example, container image analyzer engine 152 may scan images of a software container(s) (or "container images"). In an example, the software containers may include Docker containers. The container images may be present in a software container repository (or repositories) that may store images of one or a plurality of software containers. In an example, the container repository may include a Docker registry. In an example, the software container repository (or repositories) may be present on a cloud. Each of the container images in the software container repository may be identified through a unique identifier, for example, a Universal Unique Identifier (UUID).

Each of the container images may be associated with respective metadata. As used herein, "metadata" may include data about or otherwise associated with a container image. Examples of the respective metadata may include respective application types of the container images; respective application versions of the container images; respective application vendors of the container images; respective generation dates of the container images; respective last access dates of the container images; respective encryption status of the container images; respective compression status of the container images; and respective copyright information of the container images.

The respective metadata may be present along with corresponding images in the software container repository. In an example, the metadata associated with each container image may be defined using a Containerized App Format (CAF) data structure. In an example, the CAF data structure may be based on JavaScript Object Notation (JSON), though other formats or notations are possible. An example of the CAF data structure for a container image may be given below.

```
{
'UUID': 'UUID-1'
    'App-Type': 'OS'
    'App-Vendor': 'HP',
'App-Version': '1.0',
'App-Created': '10-1-2015',
'App-Last-Accessed': '11-1-2015',
'Encrypted': 'True',
'Compressed': 'True'
'Copyright': 'HPE Copyright',
}
```

Container image analyzer engine 152 may scan the container images and the respective metadata of each of the container images in the software container repository to generate a mapping of respective unique identifiers of the container images and respective metadata of the container images. The mapping may be referred to as a "container image map" of the repository. In an event there are multiple software container repositories, container image analyzer engine 152 may generate a common container image map for all the repositories.

In an example, the container image map of the repository may be represented as "Map<registry_UUID, List <Map<Image_UUID, Container_Image_VO>> container_registry". The container image map may include: "registry_UUID", which may represent a Universal Unique Identifier (UUID) of the mapped repository; "Image_UUID", which may represent a UUID of a container image in the mapped repository; "container_registry", which may represent a name of the mapped repository; and "Container_Image_VO", which may represent a Value Object (VO) of a container image. In an example, the VO of a container image may include an object model as given below.

```
Container_Image_VO{
    image_uuid;
    image_name;
    size;
    app_type;
    app_vendor;
    app_version;
    app_created;
    app_last_accessed;
    is_encrypted;
    crc_check_sum;
    is_copy_right;
    priority;
}
```

Validation engine 154 may validate the mapping generated by container image analyzer engine 152 against a rule(s) to identify unique identifiers of mapped container images that meet the rule(s). In an example, the validation may include a comparison of the respective metadata of each of the container images in the mapping against a rule(s) to identify those unique identifiers that meet the rule(s). In an example, validation engine 154 may identify respective UUIDs of the mapped container images that meet the rule(s). For example, if mapped container images "ImageA" and "ImageB" meet a rule related to a size of a mapped container image, validation engine 154 may identify the respective UUIDs (for example, UUID1 and UUID5) of these container images.

A rule may specify an action to be performed on a mapped container image in an event the mapped container image meets a condition defined in the rule for performing the action. To provide an example, a rule may specify a condition that if a mapped container image is above a pre-defined size (for example, more than 10 GB), the mapped container image may be purged. The latter may be the "action" defined against the condition. In another example, a rule may specify a condition that if a last access time of a mapped container image exceeds a pre-defined time period (for example, more than six months), the mapped container image may be purged.

A rule may include multiple conditions for an action. For example, a rule may specify conditions that if a mapped container image is above a pre-defined size (for example, more than 10 GB) and unencrypted, the mapped container image may be purged. Examples of a condition that may be specified in a rule may relate to: a size of a mapped container image, a last access time of a mapped container image, copyright information of a mapped container image, an encryption status of a mapped container image, a checksum status of a mapped container image, and a compression status of a mapped container image.

A rule may specify an action or a plurality of actions that may be performed on a mapped container image in the event the image meets the condition(s) specified in the rule. Some non-limiting examples of these actions may include: purging a mapped container image; moving a mapped container image to one of a relatively low cost storage device and a relatively high cost storage device compared to the existing storage device of the mapped container image; marking or labeling the mapped container image for exclusion from a backup process; and sending a notification to a user (for example, a cloud service provider).

Some further examples of the rules along with respective action(s) specified therein are given below.

a) If image_size>policy_image_size and image_priority=LOW; action=PURGE. In this example rule, if a container image size ("image_size") is more than a predefined size ("policy_image_size") and a priority defined for the image ("image_priority") is low, an action specified in the rule ("action") may include deleting the container image.

b) If image_checksum=False; action=PURGE. In this example rule, if a container image is corrupt ("image_checksum=False"), an action specified in the rule may include deleting the container image.

c) If image_is_encrypted=False; action=MOVE to an "X" storage device. In this example rule, if a container image is unsecure ("image_is_encrypted=False"), an action specified in the rule may include transferring the container image to an "X" storage device, which may be a low cost storage device, for example.

d) If image_copyright="Unauthorized"; action=NOTIFY a user "Y". In this example rule, if a container image is illegal or unauthorized ("image_copyright="Unauthorized"), an action specified in the rule may include notifying a user "Y", which may be a cloud service provider, for example.

e) If image_last_accessed_time>policy_last_accessed_time; action=PURGE. In this example rule, if a container image is "stale". In other words, the last usage ("image_last_accessed_time") is more than a threshold time ("policy_last_accessed_time"), an action specified in the rule may include deleting the container image.

In an example, validation engine 154 may validate the mapping generated by container image analyzer engine 152 against a rule at regular time periods or at a scheduled time.

Container image analyzer engine 152 may generate a target mapping that includes the unique identifiers of the container images that are identified consequent to the validation by validation engine 152 and respective actions in the rule(s) against which the container images were validated. The mapping may be referred to as a "target image map". In an example, the target image map may include UUIDs of the mapped container images that met a rule during the validation and an action specified in the rule. Referring to an earlier example, a target image map may include a mapping of unique identifiers "UUID1" and "UUID5" and respective action(s) (for example, a purge action) specified in the rule. Thus, in some examples, the target image map includes a list of UUID-action pairs identified from validation of the mapping (and, in effect, validation of the container images).

Container image decision engine 156 may analyze the target mapping generated by container image analyzer engine 152. For each unique identifier in the target mapping, container image decision engine 156 may obtain the corresponding container image from a software container repository. Container image decision engine 156 may identify the action to be performed on the obtained image from the action listed against the unique identifier of the image in the target mapping. Container image decision engine 156 may proceed to perform the identified action on the obtained image. Likewise, container image decision engine 156 may obtain the respective container images corresponding to the unique identifiers in the target mapping from the software container repository, identify respective actions to be performed on the obtained images from the target mapping, and perform those respective actions. The action may include one or more of the actions described earlier.

Figure 2:
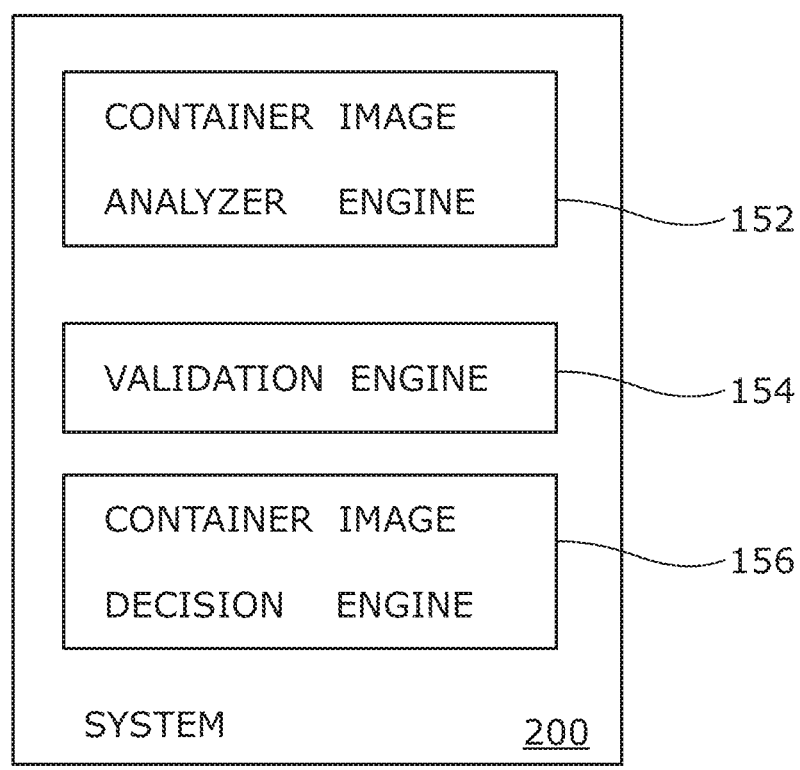
FIG. 2 is a block diagram of an example computing system for managing container images.

FIG. 2 is a block diagram of an example computing system 200 for managing container images. In an example, computing system 200 may be analogous to the computing resource 104 of FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. Said components or reference numerals may be considered alike.

In an example, system 200 may represent any type of computing device capable of reading machine-executable instructions. Examples of computing device may include, without limitation, a server, a desktop computer, a notebook computer, a tablet computer, a thin client, a mobile device, a personal digital assistant (PDA), and the like.

In an example, system 200 may include a container image analyzer engine 152, a validation engine 154, and a container image decision engine 156.

In an example, container image analyzer engine 152 may generate a mapping of respective unique identifiers of container images of a software container and respective metadata of the container images. Validation engine 154 may validate the mapping against a rule to identify a unique identifier of a mapped container image that meets the rule. In an example, the rule may specify an action to be performed on the mapped container image in an event the mapped container image meets a condition defined in the rule for performing the action. Container image analyzer engine 152 may generate a target mapping of the unique identifier of the mapped container image that meets the rule and the action specified in the rule. Container image decision engine 156 may obtain the mapped container image from a repository based on the unique identifier of the mapped container image in the target mapping. Container image decision engine 156 may perform the action specified in the rule on the mapped container image.

Figure 3:
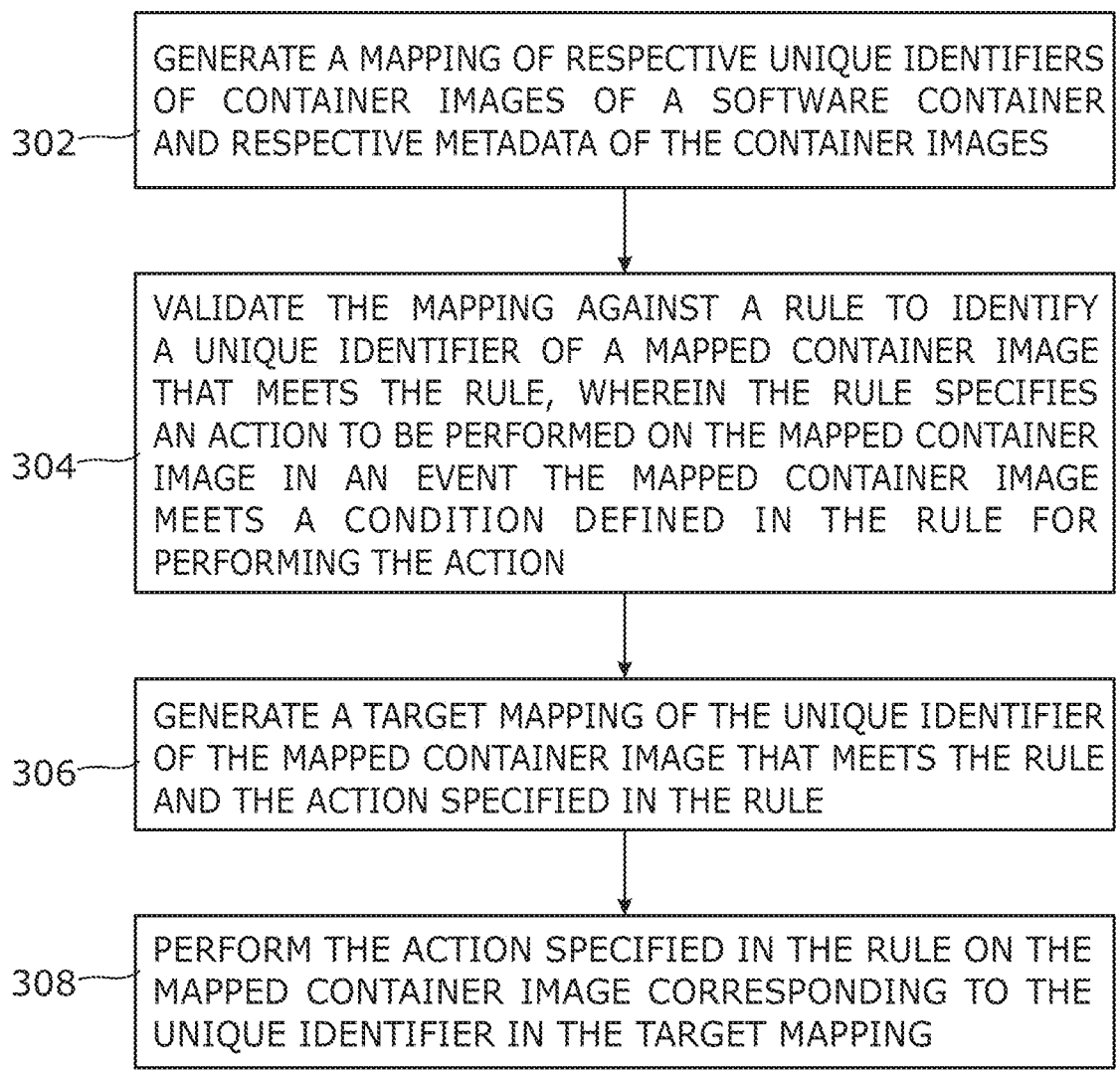
FIG. 3 is a flowchart of an example method of managing container images.

FIG. 3 is a flowchart of an example method 300 of managing container images. The method 300, which is described below, may be executed on a computing device such as computing resource 104 of FIG. 1 or system 200 of FIG. 2. However, other computing devices may be used as well. At block 302, a container image analyzer engine (for example, 152) may generate a mapping of respective unique identifiers of container images of a software container and respective metadata of the container images. At block 304, a validation engine (for example, 154) may validate the mapping against a rule to identify a unique identifier of a mapped container image that meets the rule. In an example, the rule may specify an action to be performed on the mapped container image in an event the mapped container image meets a condition defined in the rule for performing the action. At block 306, the container image analyzer engine (for example, 152) may generate a target mapping that includes the unique identifier of the mapped container image that meets the rule and the action specified in the rule. At block 308, a container image decision engine (for example, 156) may perform the action specified in the rule on the mapped container image corresponding to the unique identifier in the target mapping.

Figure 4:
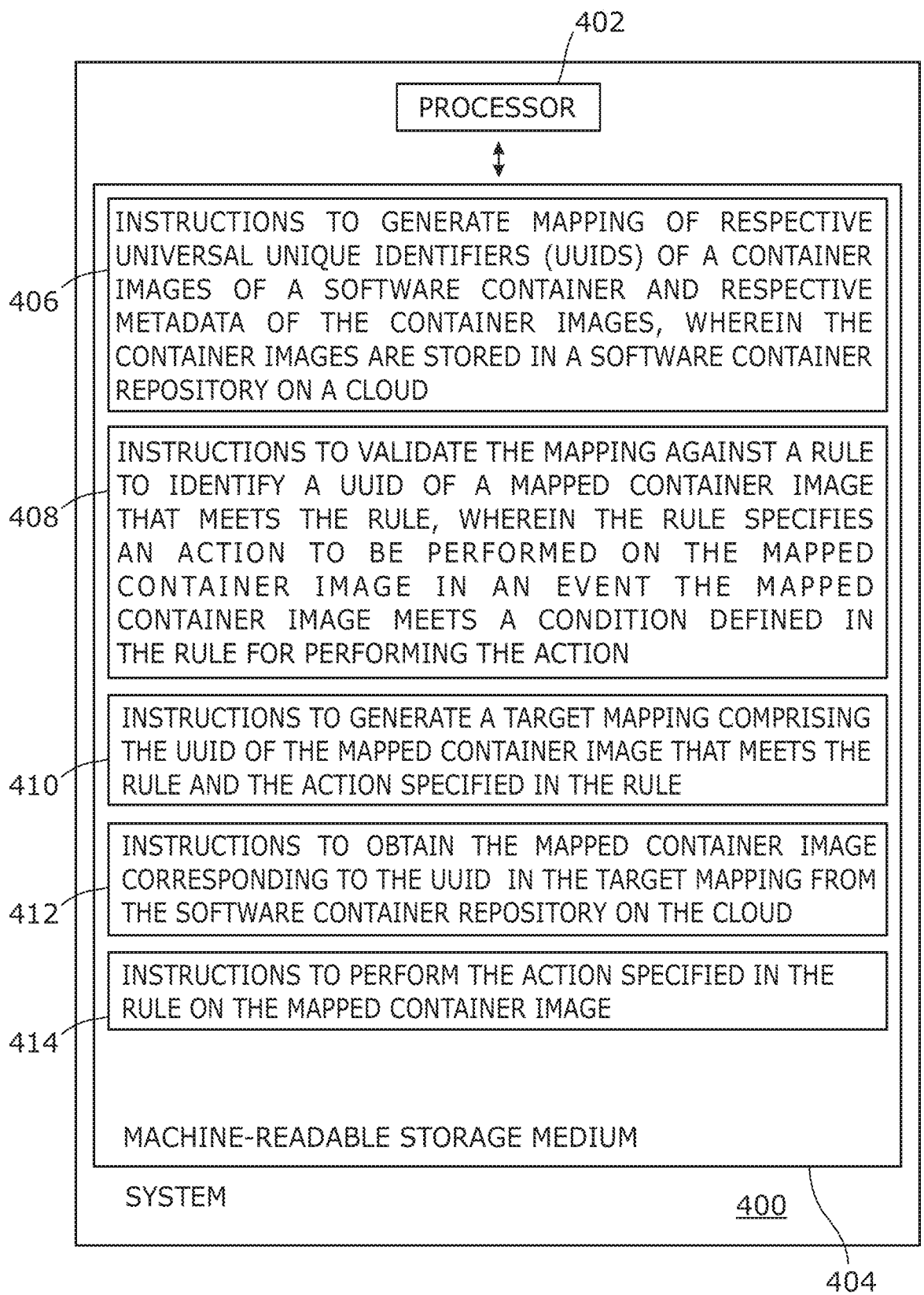
FIG. 4 is a block diagram of an example system including instructions in a machine-readable storage medium for managing container images.

FIG. 4 is a block diagram of an example system 400 including instructions in a machine-readable storage medium for managing container images. System 400 includes a processor 402 and a machine-readable storage medium 404 communicatively coupled through a system bus. In some examples, system 400 may be analogous to a computing resource 104 of FIG. 1 or systems 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 404 may store instructions 406, 408, 410, 412, and 414. In an example, instructions 406 may be executed by processor 402 to generate a mapping of respective Universal Unique Identifiers (UUIDs) of container images of a software container and respective metadata of the container images, wherein the container images are stored in a software container repository on a cloud. Instructions 408 may be executed by processor 402 to validate the mapping against a rule to identify a UUID of a mapped container image that meets the rule, wherein the rule may specify an action to be performed on the mapped container image in an event the mapped container image meets a condition defined in the rule for performing the action. Instructions 410 may be executed by processor 402 to generate a target mapping comprising the UUID of the mapped container image that meets the rule and the action specified in the rule. Instructions 412 may be executed by processor 402 to obtain the mapped container image corresponding to the UUID in the target mapping from the software container repository based on the UUID of the mapped container image in the target mapping. Instructions 414 may be executed by processor 402 to perform the action specified in the rule on the mapped container image.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution.

The invention claimed is:

1. A method comprising:
   generating a mapping of respective unique identifiers of container images of a software container and respective metadata of the container images, wherein the container images include build components of the software container to be used at runtime;
   validating the mapping against a rule at regular time periods to identify, based on evaluation of the respective metadata of the container images, a unique identifier of a mapped container image from among the container images that meets the rule, wherein the rule specifies an action to be performed on the mapped container image in an event the mapped container image meets a condition defined in the rule for performing the action;
   responsive to identifying the unique identifier of the mapped container image that meets the rule, generating a target mapping that includes the unique identifier of the mapped container image that meets the rule and the action specified in the rule; and
   performing the action specified in the rule on the mapped container image corresponding to the unique identifier in the target mapping,
   wherein the rule specifies a plurality of conditions against which the respective metadata of the container images are evaluated and specifies associated actions for the plurality of conditions, including:
      a condition of the mapped container being stale as indicated by a last access time in metadata of the mapped container image exceeding a policy threshold time, and a corresponding action of deleting the mapped container,
      a condition of the mapped container image being corrupt as indicated by a checksum status in the metadata of the mapped container image being set to false, and a corresponding action of deleting the mapped container image meeting the condition of being corrupt, and
      a condition of the mapped container being unsecure as indicated by an encryption status in the metadata of the mapped container image being set to false, and a corresponding action of transferring to a different storage device the mapped container image meeting the condition of being unsecure.

2. The method of claim 1, wherein the validating comprises comparing the respective metadata of the container images in the mapping against the rule to identify unique identifiers of mapped container images that meet the rule.

3. The method of claim 1, wherein the generating comprises:
   scanning the respective unique identifiers of the container images of the software container and respective metadata of the container images from a software container repository.

4. The method of claim 1, wherein the performing comprises:
   obtaining the mapped container image from a software container repository.

5. The method of claim 1, wherein at least one of the respective unique identifiers of the container images of the software container and the respective metadata of the container images are stored in a software container repository on a cloud.

6. A system comprising:
   a processor; and
   a memory storing non-transitory machine-readable instructions to cause the processor to:
      generate a mapping of respective unique identifiers of container images of a software container and respective metadata of the container images, wherein the container images include build components of the software container to be used at runtime;
      validate the mapping against a rule at regular time periods to identify, based on evaluation of the respective metadata of the container images, a unique identifier of a mapped container image from among the container images that meets the rule, wherein the rule specifies an action to be performed on the mapped container image in an event the mapped container image meets a condition defined in the rule for performing the action;
      responsive to an identification that the unique identifier of the mapped container image that meets the rule, generate a target mapping of the unique identifier of the mapped container image that meets the rule and the action specified in the rule;
      obtain the mapped container image corresponding to the unique identifier in the target mapping from a software container repository; and
      perform the action specified in the rule on the mapped container image,
   wherein the rule specifies a plurality of conditions against which the respective metadata of the container images are evaluated and specifies associated actions for the plurality of conditions, including:
      a condition of the mapped container being stale as indicated by a last access time in metadata of the mapped container image exceeding a policy threshold time, and a corresponding action of deleting the mapped container,
      a condition of the mapped container image being corrupt as indicated by a checksum status in the metadata of the mapped container image being set to false, and a corresponding action of deleting the mapped container image meeting the condition of being corrupt, and
      a condition of the mapped container being unsecure as indicated by an encryption status in the metadata of the mapped container image being set to false, and a corresponding action of transferring to a different storage device the mapped container image meeting the condition of being unsecure.

7. The system of claim 6, wherein the action includes to relocate the mapped container image to one of a relatively low cost storage device and a relatively high cost storage device.

8. The system of claim 6, wherein the action includes to send a notification related to the mapped container image to a user.

9. The system of claim 6, wherein the respective metadata of the container images is defined in a JavaScript Object Notation (JSON) format.

10. The system of claim 6, wherein the action includes to exclude the mapped container image from a backup process.

11. A non-transitory machine-readable storage medium comprising instructions, the instructions executable by a processor to:
    generate a mapping of a respective Universal Unique Identifiers (UUIDs) of container images of a software container and respective metadata of the container images, wherein the container images are stored in a software container repository on a cloud, wherein the container images include build components of the software container to be used at runtime;
    validate the mapping against a rule at regular time periods to identify, based on evaluation of the respective metadata of the container images, a UUID of a mapped container image from among the container images that meets the rule, wherein the rule specifies an action to be performed on the mapped container image in an event the mapped container image meets a condition defined in the rule for performing the action;
    responsive to an identification that the unique identifier of the mapped container image that meets the rule, generate a target mapping comprising the UUID of the mapped container image that meets the rule and the action specified in the rule;
    obtain the mapped container image corresponding to the UUID in the target mapping from the software container repository on the cloud; and
    perform the action specified in the rule on the mapped container image,
    wherein the rule specifies a plurality of conditions against which the respective metadata of the container images are evaluated and specifies associated actions for the plurality of conditions, including:
        a condition of the mapped container being stale as indicated by a last access time in metadata of the mapped container image exceeding a policy threshold time, and the action of deleting the mapped container,
        a condition of the mapped container image being corrupt as indicated by a checksum status in the metadata of the mapped container image being set to false, and a corresponding action of deleting the mapped container image meeting the condition of being corrupt, and
        a condition of the mapped container being unsecure as indicated by an encryption status in the metadata of the mapped container image being set to false, and a corresponding action of transferring to a different storage device the mapped container image meeting the condition of being unsecure.

12. The storage medium of claim 11, further comprising instructions to:
    generate the respective metadata of the container images, wherein the respective metadata is defined in a JavaScript Object Notation (JSON) format.

13. The storage medium of claim 12, wherein the respective metadata includes at least one of respective application types of the container images; respective application versions of the container images; respective application vendors of the container images;
    respective generation dates of the container images; respective last access dates of the container images; respective encryption status of the container images; respective compression status of the container images; and respective copyright information of the container images.

14. The storage medium of claim 11, wherein the action includes to delete the mapped container image.

15. The storage medium of claim 11, wherein the metadata of the mapped container image includes:
    a size of the particular container image,
    an application type of the particular container image,
    an application version of the particular container image,
    an application vendor of the particular container image,
    a generation date of the particular container image,
    a last access date of the particular container image,
    an encryption status of the particular container image,
    a compression status of the particular container image, or
    copyright information of the particular container images.

16. The storage medium of claim 11, wherein
    the plurality of actions further includes deleting the mapped container image, relocating the mapped container image to a different storage device than a storage device on which the mapped container image is currently stored, and excluding the mapped container image from a backup process.

* * * * *